United States Patent [19]

Bruning et al.

[11] Patent Number: 4,542,390

[45] Date of Patent: Sep. 17, 1985

[54] INK JET PRINTER PURGING DEVICE AND PROCESS

[75] Inventors: John W. Bruning, Mulino; Stephen C. Fuller, Wilsonville, both of Oreg.

[73] Assignee: Tektronix, Inc., Beaverton, Oreg.

[21] Appl. No.: 518,591

[22] Filed: Jul. 29, 1983

[51] Int. Cl.[4] ...................... G01D 15/16; G01D 15/18

[52] U.S. Cl. ................................ 346/140 R; 346/1.1; 188/352

[58] Field of Search ......................... 346/140 PD, 1.1; 188/352; 101/366

[56] References Cited

U.S. PATENT DOCUMENTS

| | | | |
|---|---|---|---|
| 1,825,013 | 9/1931 | Patton | 188/352 |
| 3,326,123 | 6/1967 | Smalley | 101/366 |
| 4,307,917 | 12/1981 | Hasselbacher et al. | 188/352 X |
| 4,358,781 | 11/1982 | Yamamori et al. | 346/140 PD |

FOREIGN PATENT DOCUMENTS

| | | | |
|---|---|---|---|
| 2725270 | 12/1977 | Fed. Rep. of Germany | 346/140 PD |

OTHER PUBLICATIONS

Blanck, T. W., "Automatic Air Trap Purging", IBM Technical Disclosure Bulletin, vol. 23, No. 8, Jan. 1981, pp. 3777-3779.

*Primary Examiner*—E. A. Goldberg
*Assistant Examiner*—Patrick W. Foster
*Attorney, Agent, or Firm*—John D. Winkelman; Francis I. Gray

[57] ABSTRACT

An ink jet printer having an ink jet head unit including a head and a three way valve mounted on a bracket. The bracket is removabley mounted to the printer and allows the unit to be replaced in the field. The valve of the new unit is positioned to close off flow to the head while opening flow from the ink source outlet to a disposal outlet. Upon connection of the new unit to the system, a quantity of ink is flushed through the valve to remove impurities introduced during the connection process. The valve is then adjusted to connect flow of ink to the head while closing off the disposal outlet and thereby avoid contamination of the new head.

2 Claims, 7 Drawing Figures

INK JET PRINTER PURGING DEVICE AND PROCESS

FIELD OF INVENTION

This invention relates to ink jet printers and more particularly to a means for purging the ink flow system.

BACKGROUND OF THE INVENTION

Ink jet printers are capable of producing multicolored ink drawings and printings of various type or kind. Ink jet printer heads scan the entire surface of a paper sheet and tiny droplets of ink are deposited on the sheet in the areas designated by a central control.

An ink jet printer is capable of depositing these droplets in any or all of several hundreds of thousands of designated positions on a single sheet of paper in a single pass of the ink jet heads. It is able to do this in a practical and efficient manner by the application of a sophisticated electrical system that precisely signals the printer heads when to deposit the ink droplets. The heads very rapidly pass over the designated positions on the sheet and there is only a fraction of a second available for depositing the ink droplet. The electronics can rapidly identify the designated positions and accurately generate the electronic signals. The major problems that have to be overcome are generally in the ink flow system.

The ink jet heads use piezoelectric crystals that respond to the electronic signals and function like tiny diaphram pumps that pump the ink droplets out through the ejecting outlet of the head. An air supply can be introduced at the outlet to accelerate the ink ejection. Ink flow is interrupted after each pumping stroke of the crystal simply by the meniscus that forms within the outlet opening.

It will be appreciated that the ink flow system including the outlet is minute and special inks are required to satisfy the system's specifications. Most important is the requirement that the ink be free of bubbles and impurities. Even a small fleck of dirt can lodge in the outlet and clog it. An air bubble is compressible and the pressure of the piezoelectric crystal will be absorbed by the bubble and the system will fail to eject the ink droplets.

Whereas special formulas of ink and sterile mixing and bottling techniques can insure the purity of the ink source, a major problem is introduced when maintenance is required for the system. For example, it may be necessary to replace a head. The ink flow lines have to be disconnected from the old head and reconnected to a new one. Instead of the sterile surroundings in the factory, this job is done at the operating site and, invariably, bubbles and/or other impurities get into the system.

SUMMARY OF THE INVENTION

Previously ink lines were connected to the heads through a simple on-off valve mounted to the head and forming a part of the head unit. The present invention replaces the on-off valve with a three way valve including a bleed outlet. When a head unit is to be replaced, the ink line is pinched off and disconnected from the valve. A new head unit is put in place and a disposal ink line is connected to the bleed outlet of the new valve. With the valve open to the bleed outlet and closed to the head, a quantity of ink is passed through the disposal line into a receptical. This quantity of ink insures that the impurities or bubbles introduced at the connection are bled from the system and the valve is then positioned to open the line to the head while closing the bleed outlet.

DETAILED DESCRIPTION INCLUDING DRAWINGS

The invention will be further appreciated by reference to the following detailed description of the preferred embodiment and the drawings thereof wherein.

Figure 7:
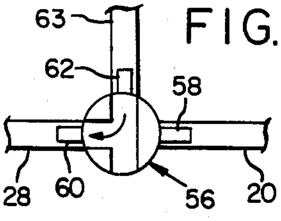
Figure 6:
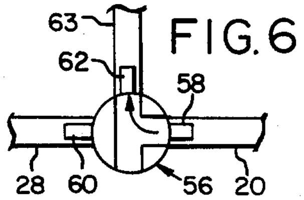
Figure 5:
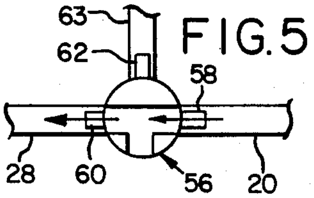

FIGS. 5,6, and 7, are schematic illustrations of the various positions of the valve mechanism used to purge the ink flow system.

Figure 1:
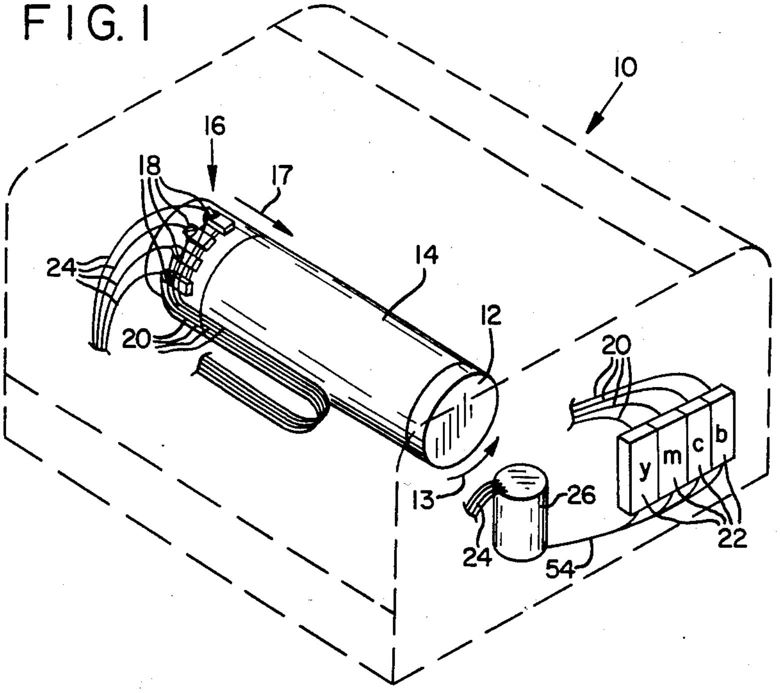
FIG. 1 is a perspective view illustrating the major components of an ink jet printer in accordance with the present invention.

Referring to FIG. 1 of the drawings, an ink jet printer 10 includes a drum 12 on which a printing media 14 (e.g. a paper sheet) is mounted. A head assembly 16 is positioned adjacent to the drum 12 and is movable along the length of the drum as indicated by arrow 17. The ink head assembly 16 includes four ink jet head units 18, each of which is connected to an ink line 20 from ink source 22, and an air line 24 from an air pump 26.

Very generally, the drum 12 rotates as indicated by arrow 13 at a precise angular speed during which the ink head assembly 16 shifts along the drum as indicated by arrow 17, a precise distance for each drum rotation. This shifting continues until the entire length of the sheet is covered. Thus in a single pass of the head assembly along the length of the drum, each head of the head assembly covers the entire exposed surface area of the sheet.

The electronics and the mechanism of the printer are such as to permit ink to be deposited in droplets. These droplets can be densely deposited and thus if desired, the entire sheet can be coated with ink. However, generally the ink deposits are selectively deposited in accordance with a central control to produce desired images. The four ink jet heads are connected to four different colors of ink, i.e. yellow, magenta, cyan and black, to produce in various combinations (by different colored ink drops being deposited on the same designated area) the range of colors desired for printing. The specifics of the control, the mechanism for shifting the ink head assembly, the mechanism for inserting and removing the paper sheet, and various others of the auxillary components are not described or illustrated herein as they are known to the art and do not form a part of this invention. Certain of the details of these components are described in U.S. Pat. No. 4,312,007 issued to Agustus W. Winfield on Jan. 19, 1982.

Figure 2:
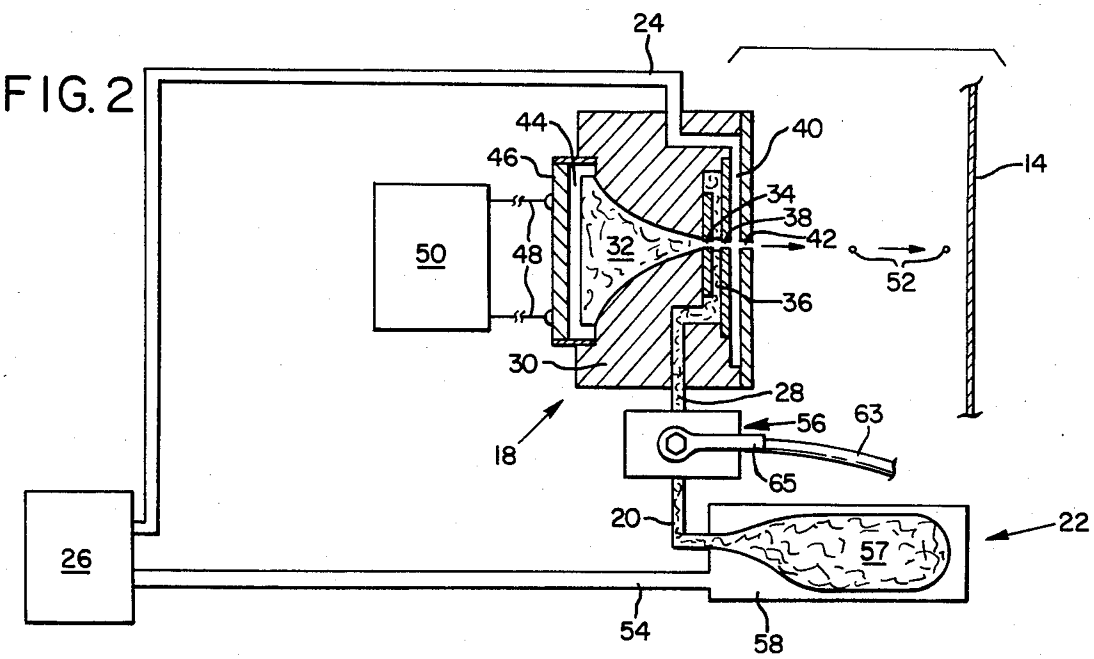
FIG. 2 is a schematic view of an ink jet printer head and related components as incorporated into the printer of FIG. 1.

FIG. 2 of the drawing is a schematic design of an ink jet head 18 and certain of the components of the system directly connected to the printing head. The printing head itself is shown in cross section and includes a housing 30 that defines an ink chamber 32. The chamber 32 has an outlet 34 that opens into an outer chamber 36. This outer chamber 36 is connected to an ink line 28 through which ink is fed to the ink jet head. An outlet 38 from the chamber 36 opens into an air chamber 40 connected to air lines 24 through which air from air pump 26 is fed to the chamber. An outlet 42 from chamber 40 exposes the chamber to a printing media 14.

Forming the back wall of ink chamber 32 is a flexible metal diaphram 44 that is backed by a piezoelectric crystal 46. The crystal 46 is connected through electrical wires 48 to a central control 50. The central control is programmed to emit electronic pulsations to the crystal 46 which flexes the diaphram 44 inwardly to force ink through opening 34 into chamber 36 which in turn forces a drop of ink out through outlet 38. The drop of ink is then caught up in the air flow being directed through outlet 42 and onto the printing media 14. The emission of the ink drops is illustrated by the dots 52 shown in the drawing.

It will be appreciated that the chambers and outlets in these chambers are very small. A meniscus is formed in outlet 38 between the ink chamber and air chamber (a surface tension phenomenon) to seal off flow of ink when pressure from the crystal 46 is released. The diaphram 44 upon return to its original position, draws ink to refill the ink chambers, and the head is ready for the next ejection. The tentative seal of the meniscus is maintained due to the equalized pressure in the ink and air chambers. This is achieved by the air pressure in chamber 40 from the air pump 26 and by the ink pressure which is developed by the same air pump 26. An air line 54 runs to the ink source 22, which is in the form of a collapsible ink bag 57 within a rigid cartridge 58. The air pressure developed in the cartridge urges collapse of the bag generating the pressure to chamber 36.

Figure 3:
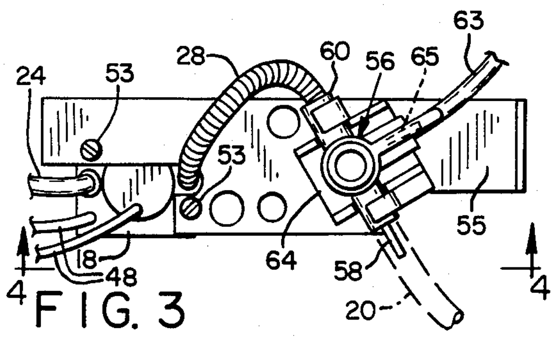
FIG. 3 is a top view of an ink jet head unit including means for purging the ink flow line to the head.
Figure 4:
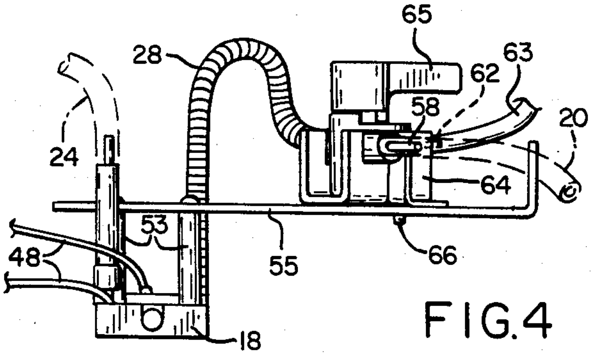
FIG. 4 is a view taken on lines 4—4 of FIG. 3.

Reference is now made to FIGS. 3 and 4 wherein an ink jet head 18 is shown mounted by posts 53 to a bracket 55. The bracket is adapted to mount the head to the head assembly 16 and as previously explained, the mechanism that carries the head assembly along the drum length is not illustrated. As explained for FIG. 2, air line 24 and electrical wires 48 are connected to the head as shown. The ink line 28 connects the head to a three way valve 56 which is mounted in a holder 64 that is fixed by a screw 66 to the bracket 55. The bracket 55 is in turn removably fixed to the head assembly 16. The ink line 20 connects the valve 56 to the ink source 22.

Referring now also to FIGS. 5, 6, and 7, which illustrate the three valve positions, it will be noted that the three way valve 56 includes three outlet stems 58, 60 and 62. Stem 58 is connected to the ink line 20 from the ink source and stem 60 is connected to the ink line 28 leading to the head 18. Stem 62 is adapted for connection to a disposal ink line 63 which is generally not connected except during the operation of changing heads. A service person carries with him a disposal line 63 and a recepticle (not shown) to be connected to stem 62 for that purpose.

With particular reference to FIG. 5, it will be noted that the valve is positioned, by handle 65, in a normal operating mode with stem 62 closed and stems 58 and 60 open. FIG. 6 shows the position of the valve when the head unit is being installed into an ink jet printer, i.e. with stem outlet 60 closed and outlets 58 and 622 open. FIG. 7 illustrates a third position i.e. with stem outlet 58 closed and outlets 60 and 62 open. This position is utilized in instances where a second liquid is to be flushed through the head, e.g., antifreeze to avoid freezing problems while the printer is in storage or during shipment.

OPERATION

With the air pump 26 turned on and prior to activation of the central control 50, the ink contained in chambers 32 and 36 is stabilized by reason of the equalization of pressures on the two sides of opening 38 wherein the meniscus is formed. A printing media 14 is positioned on the drum 12 and the central control is activated. The drum rotates at a rapid but precise angular speed, e.g., 660 revolutions per minute and with each pass of the drum past the head assembly 16, the head assembly shifts an incremental distance, along the drum axis. The precise position of the head assembly relative to the printing media is calculated by the central control, and in accordance with the program contained therein, electric impulses are directed to the piezoelectric crystal 46. On command, the crystal flexes metal diaphram 44 inwardly and a tiny droplet of ink is ejected through the outlets 34 and 38. With air in the air chamber 40 being continuously ejected through opening 42, an air flow is generated that accelerates the droplet out through opening 42 and onto the printing media. As the diaphram returns to it's normal position, ink from the ink source is drawn into the ink chambers to replace the ejected droplet and the process is ready to be repeated. The entire process is very rapidly repeated with the system capable of ejecting a droplet at a rate in excess of 40,000 per second.

It will be appreciated that the ink lines, ink chambers and openings are very small and it is important to provide a pure ink flow to the head in order to insure proper functioning of the system. Impurities in the ink will clog the openings and bubbles will interfere with the pumping action of the crystal 46. Whereas disconnecting ink lines creates the risk of introducing bubbles and impurities into the system, changing an ink jet head is accomplished by utilizing the present invention.

The ink jet head and three way valve are mounted to a bracket that forms a head unit that is mounted to the head assembly. Changing a head during servicing of the printer is accomplished by removing the bracket including both the head and valve. Thus the ink line feeding the valve has to be disconnected from the valve. This is done by shutting down the air pump and pinching off the ink line. (The electrical connections and air line are of course also disconnected). The old bracket, head and valve are removed and a new head unit mounted in its place. The valve connected to the new head is positioned to close off ink flow to the head while directing ink flow from outlet 58 to the disposal outlet 62, e.g., as shown in FIG. 6. The ink line from the ink source is connected to outlet 58 and a disposal line 63 is connected to outlet 62 which is connected to a receptacle. The air pump is turned on and a quantity of ink is bled off through outlet 62 until the service person is satisfied that the impurities and bubbles have been purged from the valve. The valve is then switched over to direct ink to the head, e.g., as shown in FIG. 5 and the system is again ready for printing.

The present invention has solved a major problem that has plagued the ink jet printer for a number of years. Having solved the problem, the solution will be readily understood and applicable to ink jet printers in general by those skilled in the art. The invention is not limited in scope to the specific embodiment described but emcompasses it's general application to ink jet printers as broadly defined in the appended claims.

We claim:

1. A method for replacing a head unit on an ink jet printer to insure that no impurities and bubbles are introduced into the system, said head unit including an ink jet head and a three way valve, comprising the steps of:

pinching off an ink line prior to removing an old head unit, said ink line being connected at one end to a first outlet of said three way valve and at the other end to an ink source, a second outlet of said three way valve being connected to said ink jet head;

mounting a new head unit in place of said old head unit, said three way valve on said new head unit being positioned to close off said second outlet;

connecting a disposal line with an associated receptacle to a third outlet and said ink line to said first outlet of said three way valve;

bleeding off a quantity of ink from said ink line into said receptacle until impurities and bubbles have been purged from said three way valve; and switching said three way valve so that ink from said ink source flows to said ink jet head.

2. A method as recited in claim 1 further comprising the steps of:

switching said three way valve so that said third outlet is connected to said second outlet;

flushing a liquid via said third outlet through said ink jet head; and switching said three way valve to close off said second outlet.

* * * * *